US006781572B2

(12) United States Patent
Funakoshi

(10) Patent No.: US 6,781,572 B2
(45) Date of Patent: Aug. 24, 2004

(54) OPTICAL POINTING DEVICE, CONTROL METHOD THEREOF AND COMPUTER PROGRAM PRODUCT RECORDING THE SAME

(75) Inventor: Takashi Funakoshi, Niigata (JP)

(73) Assignee: NEC Corporation, Tokyo (JP)

( * ) Notice: Subject to any disclaimer, the term of this patent is extended or adjusted under 35 U.S.C. 154(b) by 269 days.

(21) Appl. No.: 09/948,489

(22) Filed: Sep. 6, 2001

(65) Prior Publication Data

US 2002/0030669 A1 Mar. 14, 2002

(30) Foreign Application Priority Data

Sep. 12, 2000 (JP) ........................................ 2000-276656

(51) Int. Cl.[7] .............................................. G09G 5/08
(52) U.S. Cl. ..................................... 345/160; 345/166
(58) Field of Search ................................ 345/160, 161, 345/157, 166, 175, 163, 167

(56) References Cited

U.S. PATENT DOCUMENTS

| 5,086,197 A | * | 2/1992 | Liou ........................ 178/18.09 |
| 5,349,371 A | * | 9/1994 | Fong ........................... 345/166 |
| 6,078,312 A | * | 6/2000 | Liebenow .................... 345/166 |
| 6,107,991 A | * | 8/2000 | Osborn ........................ 345/157 |
| 6,307,535 B1 | * | 10/2001 | Kim et al. ................... 345/157 |

FOREIGN PATENT DOCUMENTS

| JP | 60-54038 | 3/1985 |
| JP | 1-133130 | 5/1989 |
| JP | 4-55635 | 5/1992 |
| JP | 6-149470 | 5/1994 |
| JP | 6-250780 | 9/1994 |
| JP | 8-54984 | 2/1996 |
| JP | 10-320110 | 12/1998 |
| JP | 11-272417 | 10/1999 |
| JP | 2000200145 | * 7/2000 |

OTHER PUBLICATIONS

Copy of Japanese Office Action dated Sep. 30, 2003 (and English translation of relevant portion).

* cited by examiner

*Primary Examiner*—Regina Liang
(74) *Attorney, Agent, or Firm*—Dickstein, Shapiro, Morin & Oshinsky, LLP.

(57) ABSTRACT

To provide an optical pointing device capable of being provided as a device of short stature, being used integrally with an apparatus having a limited stature and a limited space, reducing cost and improving reliability. A pointing board has an X axis line pattern and a Y axis line pattern which are orthogonal to each other. When the pointing device is moved on a support base provided on a control circuit board, lights from an X and Y axis light emitting devices crosses the X and Y axis line patterns and are reflected. The reflected light is detected as an optical pulses by an X and Y axis photo-detectors. Coordinate information according to a movement direction and a movement quantity is converted into an electrical signal, and a cursor is moved on a display screen of the computer.

18 Claims, 14 Drawing Sheets

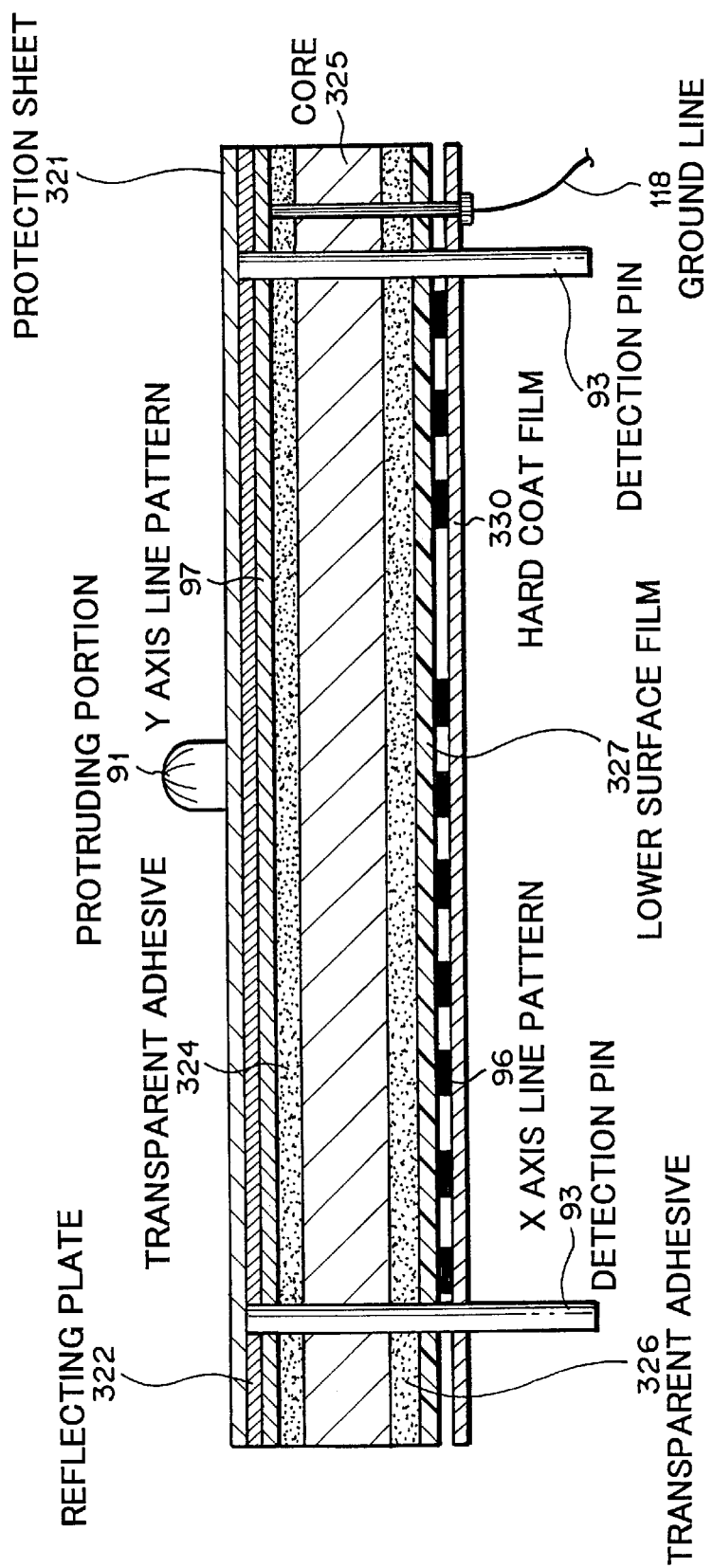

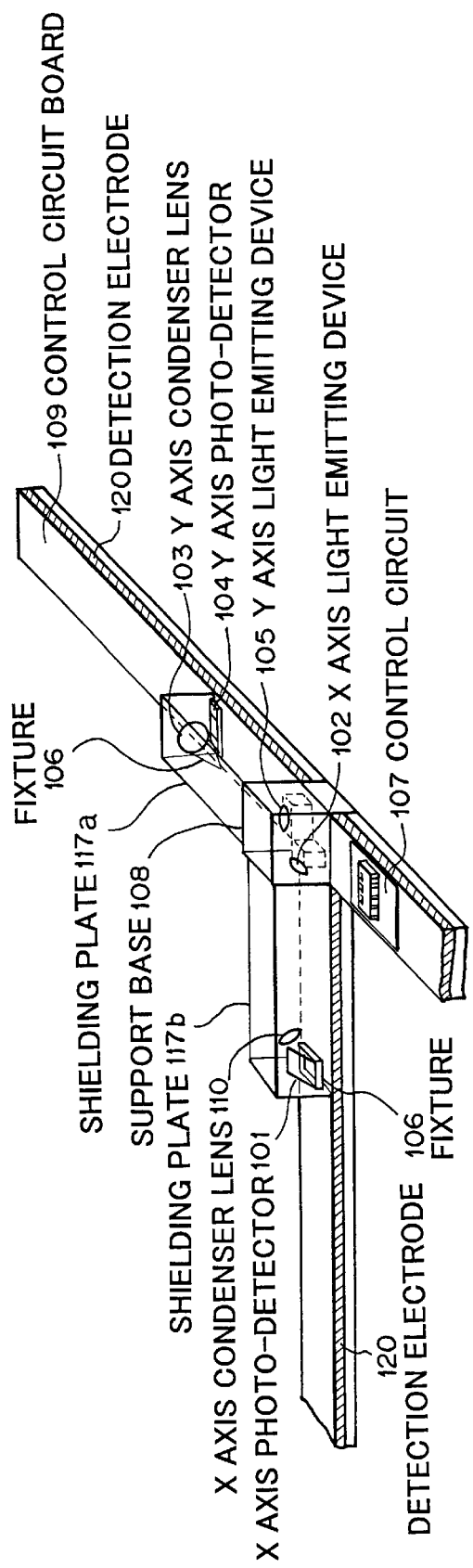

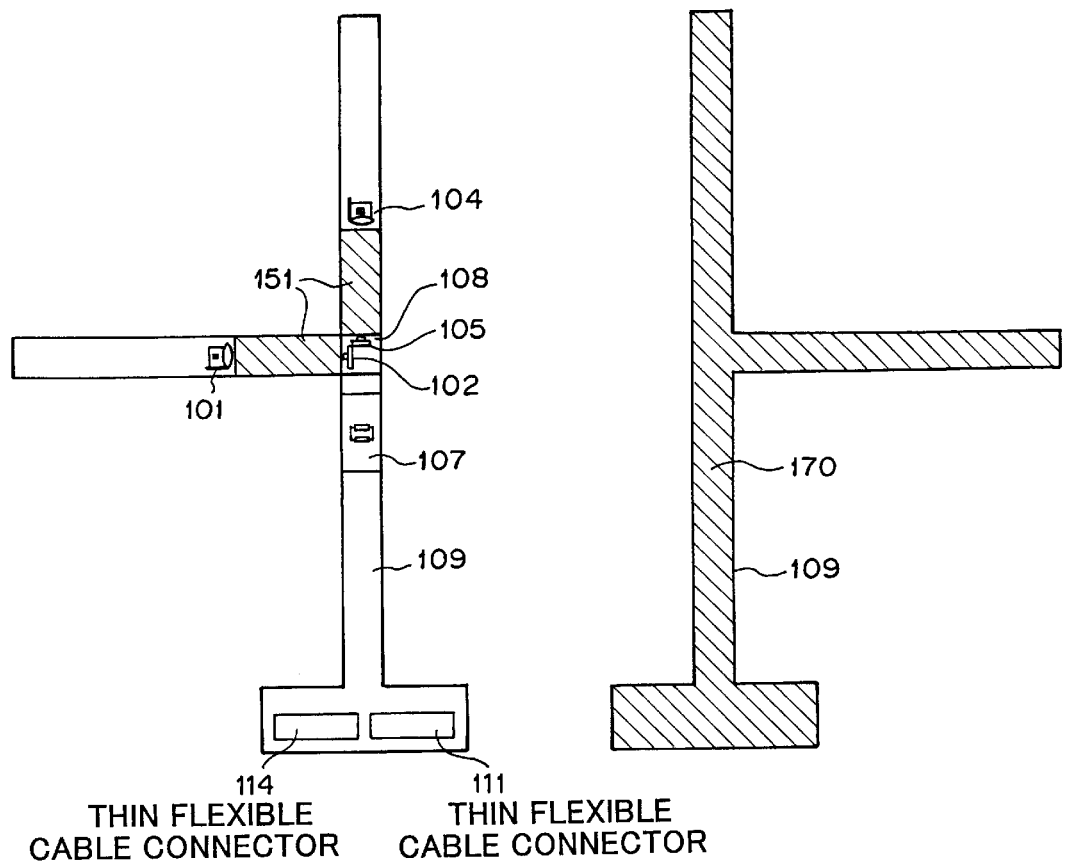

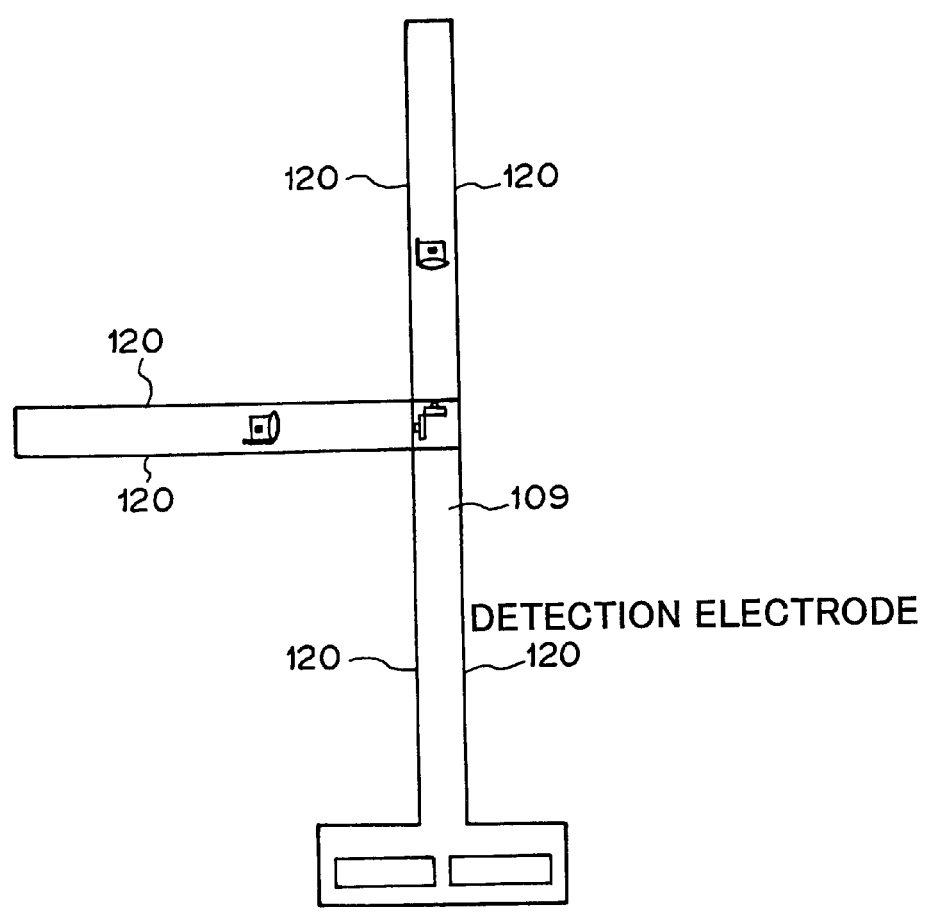

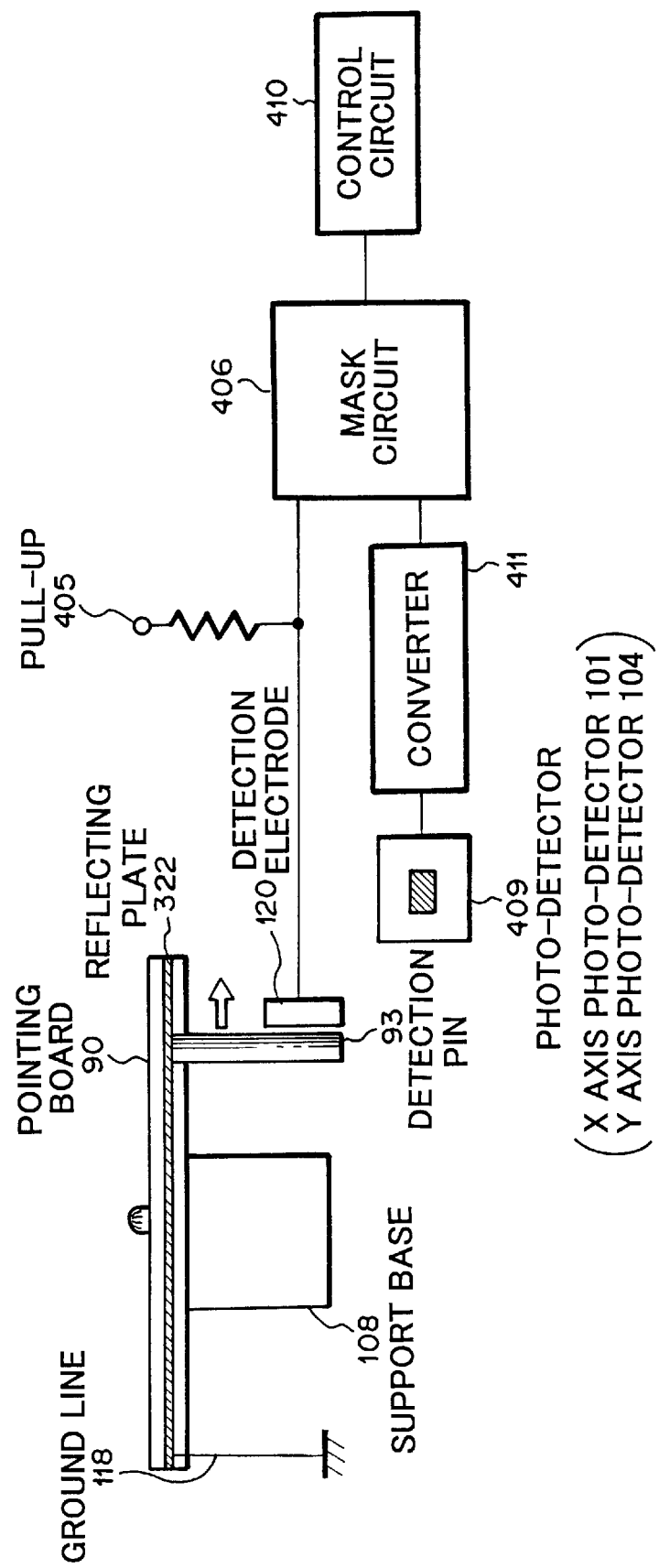

FIG.10A
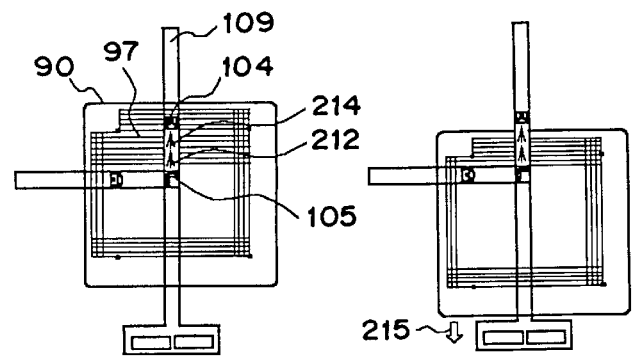
FIG.10B
FIG.10C
FIG.10D
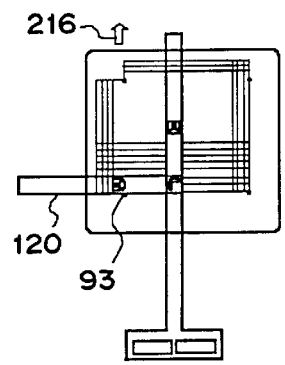
FIG.10E
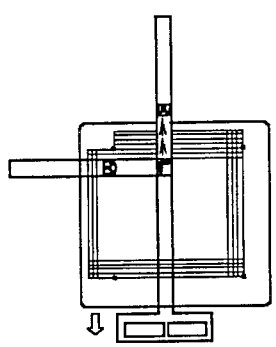
FIG.10F
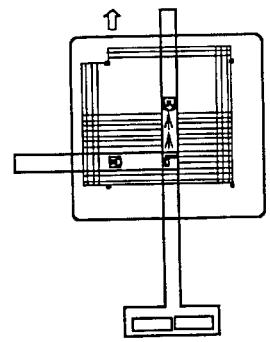
FIG.10G
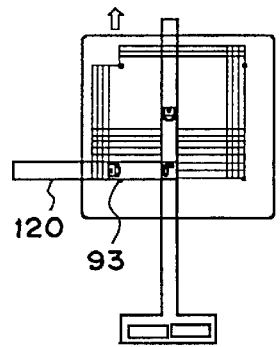
FIG.10H
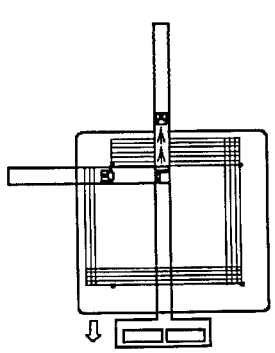
FIG.10I
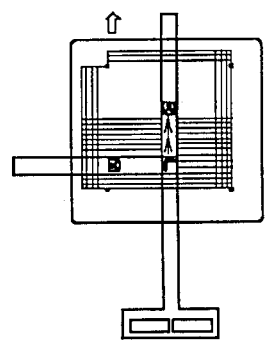

OPTICAL POINTING DEVICE, CONTROL METHOD THEREOF AND COMPUTER PROGRAM PRODUCT RECORDING THE SAME

BACKGROUND OF THE INVENTION

1. Technical Field of the Invention

The present invention relates to an optical pointing device for moving a cursor on the display screen of an information processing apparatus such as a personal computer or a workstation computer, an optical pointing device control method and a computer program product or recording medium recording the same. The present invention particularly relates to an optical pointing device realizing a thin, lightweight device and having improved reliability, a control method therefor and a recording medium recording the same.

2. Description of the Prior Art

It is conventionally well known that an optical track ball provided integrally with a notebook personal computer main body is an excellent pointing device. The optical track ball is a device mechanically transmitting a rotating ball following the rotation movement of the ball in an arbitrary direction and rotating an encoder ring. The optical track ball then detects an optical variation including the on and off of light following the rotation as an optical pulse, converts coordinate information according to a movement direction and a movement quantity into an electric signal and moves a cursor on a computer screen.

A conventional optical track ball will be described hereinafter with reference to the drawings.

FIG. 13 is an exploded perspective view showing the schematic constitution of the conventional optical track ball. FIG. 14 is a view seen from an arrow A in FIG. 13. FIG. 15 is a detailed view of an encoder ring shown in FIG. 13.

Referring to FIGS. 13 to 15, the optical track ball 10 consists of an upper housing cover 13 integrally comprising a right click button cover 11 and a left click button cover 12, a lower housing cover 26 and a control circuit board 17 provided within the lower housing cover 26. On the control circuit board 17, a Y axis shaft encoder 28 consisting of a roller 20, an encoder ring 22 and a shaft 21, a support 25 supporting the Y axis shaft encoder 28, an X axis shaft encoder 14 consisting of a roller 35, an encoder ring 31 and a shaft 32, a support 34 supporting the X axis shaft encoder 14, a light emitting device 24 and a photo-detector 23 for an X axis direction between which the encoder ring 22 is provided, a light emitting device 33 and a photo-detector 30 for a Y axis direction between which the encoder ring 31 is provided, a right click button 15 and a left click button 16 are mounted.

A space 18 having an upper portion protruding to rotate and move a ball 19 is provided in the upper housing cover 13. The lower housing cover 26 and the upper housing cover 13 are assembled into a main body computer (not shown) by screws 27.

Next, the operation of the optical track ball 10 constituted as stated above will be described with reference to the drawings.

Referring to FIGS. 14 and 15, the X axis direction roller 35 and the Y axis direction roller 20, the phases of which rollers are different from each other by 90°, contact with the ball 19. In the movement of the ball in the X axis direction, the roller 35 in contact with the ball 19 is driven to follow the rotation movement of the ball 19, so as to rotate the shaft 32 connected to the roller 35 and supported by the support 34.

The encoder ring 31 arranged between the light emitting device 33 and the photo-detector 30 and having slits 52 is connected to the shaft 32. The encoder ring 31 rotates, thereby detecting changes in the on and off of light arriving at the photo-detector 30 from the light emitting device 33 as an optical pulse string, converts coordinate information according to a movement direction and a movement quantity into an electric signal, and moves the cursor on the computer screen.

In the movement of the ball 19 in the Y axis direction, as in the case of the above-stated X axis direction, the roller 20 in contact with the ball 19 is driven by the rotation of the ball 19 followed by the movement thereof, so as to rotate the shaft 21 connected to the roller 20 and supported by the support 25.

The encoder ring 22 provided between the light emitting device 24 and the photo-detector 23 and having slits 52 uniformly arranged thereon is connected to the shaft 21. The encoder ring 22 rotates, thereby detecting changes in the on and off of light arriving at the photo-detector 23 from the light emitting device 24 as an optical pulse string, converts coordinate information according to a movement direction and a movement quantity into an electric signal, and moves the cursor on the computer screen.

Referring to FIG. 15, each of the encoder rings 22 and 31 is circular, a plurality of slits 52 are uniformly and radially arranged about the shaft 21 or 32 and radiated light from the light emitting device 24 or 33 arrives at the photo-detector 23 or 30 through these slits 52. The distance, area and shape of the slits 52 are closely related to the resolution of the cursor, i.e., the movement distance of the cursor per unit length when the cursor moves.

As stated above, the rotation movement of the ball 19 is required to accurately synchronize with the movement of the cursor. Due to this, the conventional optical track ball 10 requires a structural component preventing a slip loss that only the ball 19 rotates and the rollers 20 and 35 cannot be driven, by constantly bringing the ball 19 into contact with the rollers 20 and 35 with equal forces. A press roller 45 shown in FIG. 14 is a spring structural component consisting of a pressure spring 44 and a rotational roller 43. The press roller 45 is suited to properly maintain the positional relationship between the ball 19 and the rollers 20, 35. However, while the ball 19 freely moves in a ball gauge (not shown) longitudinally, laterally and vertically, the press roller 45 is fixed and cannot completely follow up the movement of the ball 19. For that reason, the press roller 45 has disadvantages in that it cannot completely prevent the slip loss of the ball 19 and deteriorates reliability.

Further, the conventional optical track ball 10 requires many complicated structural components in a mechanically movable section, disadvantageously increasing component cost, assembly cost and component and assembly management cost.

Moreover, the ball 19 serving as the mechanically movable section of the structural components, the encoder rings 22 and 31 rotating in response to the movement of the ball 19, the supports 25 and 34 and the press roller 45 consisting of the pressure spring 44 and the rotational roller 43 are tallest components among the structural components and unsuited for providing the device of shorter stature. Thus, the conventional optical ball is disadvantageously unsuited to be used y integrally with an apparatus, typically a notebook computer, having a limited stature and a limited space.

As stated above, a mechanical slip loss inevitably occurs between the ball serving as the mechanically movable section among the structural components and each shaft encoder rotating in response to the movement of the ball when the rotation of the ball is transmitted from the ball to the roller of each shaft encoder. Due to this, the conventional optical track ball disadvantageously deteriorates reliability.

In addition, the conventional optical track ball requires many complicated structural components, disadvantageously increasing component cost, assembly cost and component and assembly management cost.

Moreover, the ball serving as the mechanically movable section among the structural components, the shaft encoder, the supports and the press roller consisting of the pressure spring and the rotating roller are tallest components among the structural components and unsuited for providing the device of shorter stature. Thus, the conventional optical ball is disadvantageously unsuited to be used integrally with an apparatus, typically a notebook computer, having a limited stature and a limited space.

SUMMARY OF THE INVENTION

It is an object of the present invention to provide an optical pointing device capable of solving the above-stated problems by changing the movement of a mechanically movable section of structural components from three-dimensional movement to two-dimensional movement, that is, making the mechanically movable section movable in a plane.

The optical pointing device of the present invention is characterized by comprising: a pointing board having stripe-like line patterns provided in an X axis direction and a Y axis direction, respectively, the patterns orthogonal to each other, and having a protruding portion; an upper housing cover covering an upper surface of the pointed board, and having an opening portion provided around the protruding portion of the pointing board, a left click button cover, and a right click button cover; a click button control circuit board mounting thereon a left click button and a right click button arranged right under the left click button cover and the right click button cover, respectively, and a first thin flexible cable connector, the click button control circuit board fixedly attached to a lower surface of the upper housing; and a control circuit board having a support base supporting the pointing board, a light emitting device irradiating light to the light patterns, a photo-detector detecting an optical change due to reflection or cutoff of irradiated light from the line patterns, and a control circuit controlling a signal from the photo-detector and signals from the left click button and the right click button.

Further, the optical pointing device control method of the present invention is characterized by comprising: moving a pointing board having stripe-like line patterns provided in an X axis direction and a Y axis direction, respectively, the line patterns orthogonal to each other, and having a protruding portion, by operation of the protruding portion, thereby detecting, by means of a photo-detector, as an optical pulse string, an optical change due to reflection or cutoff of irradiated light occurring when the irradiated light from a light emitting device provided on a control circuit crosses the line patterns, and converting coordinate information according to a movement direction and a movement quantity of the pointing board into an electric signal.

Further, the computer program product, or recording medium of the present invention is characterized by being a recording medium recording an optical pointing device control program.

As stated so far, the optical pointing device of the present invention has advantages in that the pointing board moving two-dimensionally in the plane is provided as the mechanically movable section, whereby the structure of the mechanically movable section can be simplified, the device of short stature can be provided and the device can be used integrally with an apparatus having a limited stature and a limited space.

Further, since the number of the components of the movable section can be greatly reduced, it is possible to reduce component cost, assembly cost and component and assembly management cost and it is also possible to improve the yield of a production line and reliability, thereby making it possible to deal with the realization of assembly automation.

Moreover, by providing the protruding portion for movement operation and forward direction lines which become marks for the movement direction are provided on the pointing board, the cursor on the display screen is moved in the same directed direction as that of the pointing board. Hence, the optical pointing device of the present invention is advantageously excellent in pointing direction.

BRIEF EXPLANATION OF THE DRAWINGS

FIG. 4 is a cross-sectional view taken along BB of FIG. 3A.

FIG. 5 is an enlarged perspective view of the neighborhood of the support base of a control circuit board.

FIG. 6A is a top view showing a component mounting prohibited area on the control circuit board by oblique lines.

FIG. 6B is a bottom view showing a component mounting prohibited area by oblique lines.

FIG. 7 is a detailed view showing positions at which detection electrodes are provided on the control circuit board.

FIG. 9 is a typical view showing the connection relationship among a detection pin, a detection electrode and a control circuit.

FIGS. 10A to 10I are schematic plan views showing various states when the pointing board is moved to a Y axis direction.

PREFERRED EMBODIMENT OF THE INVENTION

Figure 1:
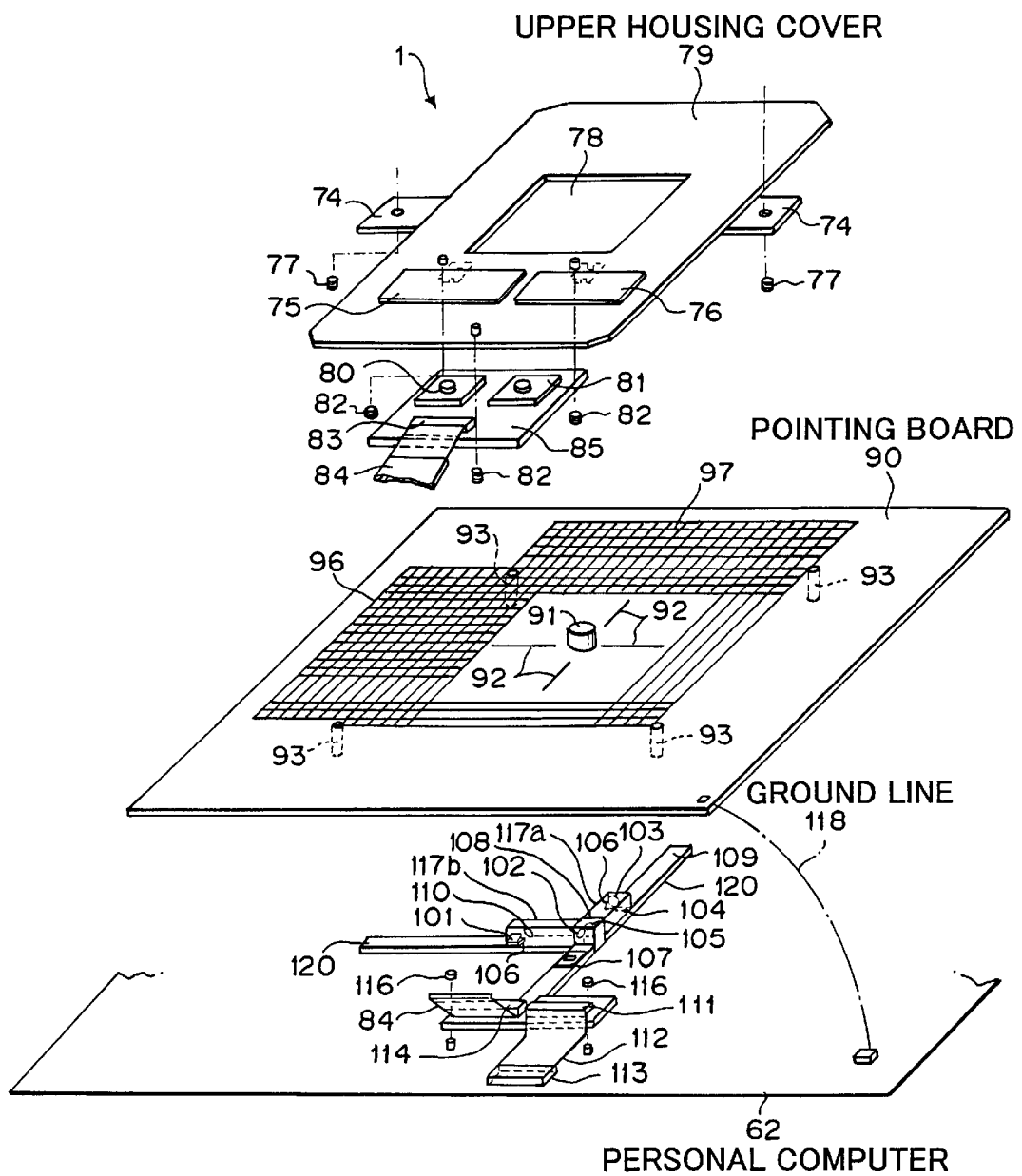
FIG. 1 is an exploded perspective view showing the constitution of an optical pointing device of the present invention.
Figure 2:
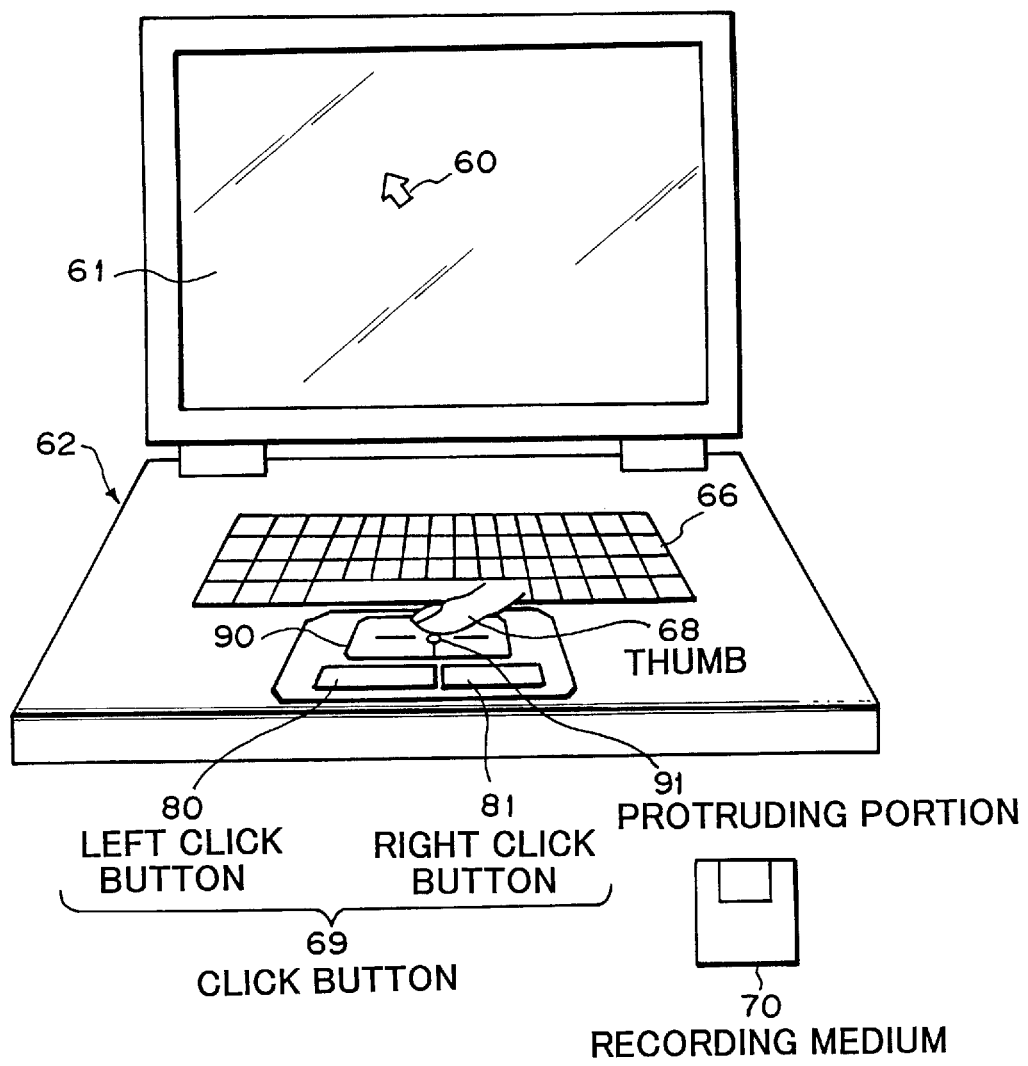
FIG. 2 is a schematic perspective view showing an appearance of the optical pointing device of the present invention in a state in which the optical pointing device is mounted on the personal computer.

The optical pointing device of the present invention is used for a notebook personal computer or a workstation computer including a mouse system in a computer main body. FIG. 1 is an exploded perspective view of the constitution of an optical pointing device of the present invention, showing one mode for carrying out the optical pointing device 1. FIG. 2 is a schematic perspective view showing the appearance of the optical pointing device 1 in a state in which the optical pointing device 1 is mounted on a notebook personal computer 62.

Referring first to FIG. 2, a pointing board 90 is provided in front of and below the keyboard 66 of the personal computer 62, a click button 69 has a left click button 80 provided left in front of a pointing keyboard 90 and a right click button 81 provided at the right of the left click button 80.

A protruding portion 91 is operated by a thumb 68 or the like. Therefore, its upper surface and entire side surfaces are subjected to a non-slip treatment such as the application of rubber. The protruding portion 91 is a unified part of a pointing board 90. The movement of a cursor 60 on the screen 61 of the notebook personal computer 62 is conducted by moving the protruding portion 91 in an arbitrary direction with the thumb 68 or the like.

In addition, a recording medium 70 recording a control program for executing movement control is provided.

Referring to FIG. 1, the optical pointing device 1 includes: pointing board 90; an upper housing cover 79; a click button control circuit board 85; and a control circuit board 109.

Here, the pointing board 90 includes: a stripe-like X axis line pattern 96 provided in an X axis direction and a stripe-like Y axis line pattern 97 in a Y axis direction which are orthogonal to each other and a protruding portion 91.

The upper housing cover 79 covers the upper surface of the pointing board 90 and has an opening portion so that the protruding portion 91 can be freely moved, a left click button cover 75, and a right click button cover 76.

The click button control circuit board 85 on which a left click button 80 and a right click button 81 are arranged under the left click button cover 75 and the right click button cover 76, respectively. A thin flexible cable connector 83 are mounted and which board is fixedly attached to the lower surface of the upper housing cover 79.

The control circuit board 109 includes: a support base 108 supporting the pointing board 90; an X axis light emitting device 102 and a Y axis light emitting device 105; an X axis photo-detector 101 and a Y axis photo-detector 104; and a control circuit 107 controlling signals from the both detectors and signals from the left click button 80 and the right click button 81.

The upper housing cover 79 has guides 74 on left and right ends, respectively and the guides 74 of the cover 79 are fixed to personal computer 62 main body by nuts 77. The control circuit board 109 is fixed to the personal computer 62 main body by nuts 116. The pointing board 90 is located between the upper housing cover 79 and the control circuit board 109. The pointing board 90 is disposed on the support base 108 of the control circuit board 109 and assembled into the personal computer 62 main body in a free state in which the pointing board 90 is separated from the upper housing cover 79.

The thin flexible cable connector 83 relaying click signal from the left click button 80 and the right click button 81 is connected to the thin flexible cable connector 114 of the control circuit board 109 through a flexible cable 84. A thin flexible cable connector 111 arranged next to the thin flexible cable connector 114 is connected to the thin flexible cable connector 113 of the personal computer 62 through a flexible cable 112.

Next, the detailed constitution of the pointing board 90 will be described with reference to the drawings.

Figure 3A:
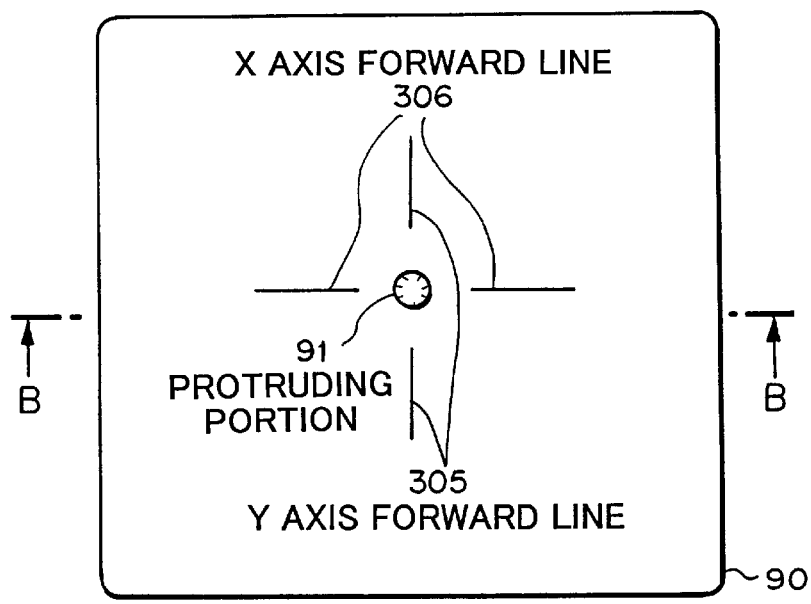
FIG. 3A is an upper plan view of the pointing board.
Figure 3B:
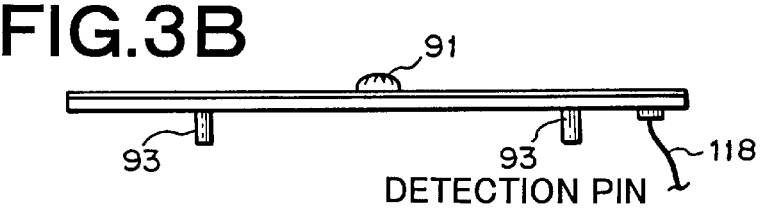
FIG. 3B is a front view of the pointing board.
Figure 3C:
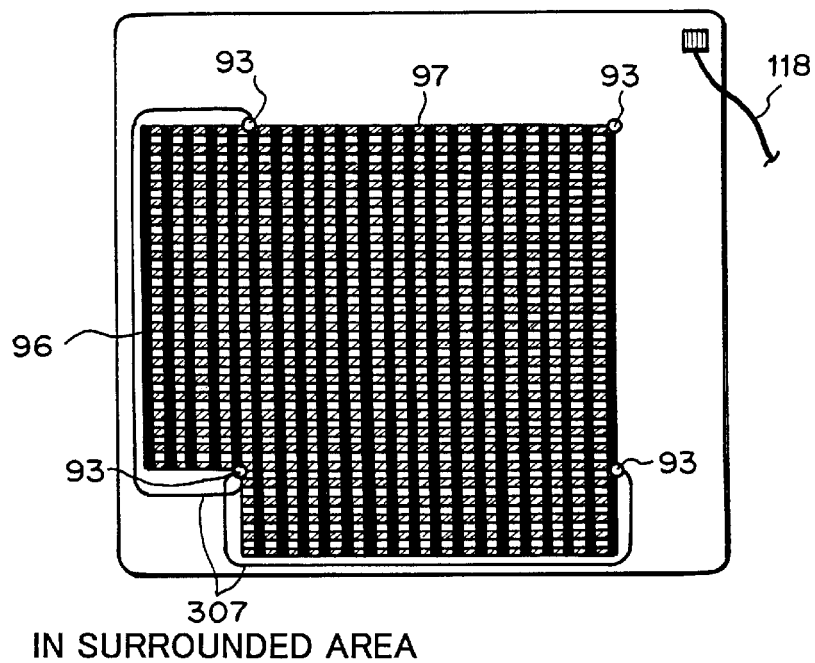
FIG. 3C is a lower plan view of the pointing board.

FIGS. 3A, 3B and 3C are a upper plan view, a front view and a lower plan view of the pointing board 90, respectively. FIG. 4 is a cross-sectional view taken along BB of FIG. 3A.

Referring to FIGS. 3A to 4, the pointing board 90 has an X axis forward direction line 306 and a Y axis forward direction line 305 which are forward direction lines 92 serving as marks showing a movement direction and which are provided around the protruding portion 91. The pointing board 90 comprises a transparent acrylic resin core 325, a lower surface film 327 bonded to the lower surface of the core 325 through a transparent adhesive 326, an X line pattern 96 of an aluminum thin film formed on the lower surface film 327 having a regularly parallel stripe-like pattern printed thereon, a hard coat film 330 formed on the X axis line pattern 96 and made of a glass hard coat which was subjected to a heat curing treatment or a photo-curing acrylic resin hard coat, a Y axis line pattern 97 formed on the upper surface of the core 325 through a transparent adhesive 324 and printed black with a regularly parallel stripe-shaped pattern, a reflecting plate 322 provided on the Y axis line pattern 97 and made of a conductive material having a light reflectance of 90%, a protection sheet 321 bonded to the reflecting plate 322, four detection pins 93 for detecting positions which become limits of the movement range of the pointing board 90, and a ground line 118.

The Y axis line pattern 97 is arranged into a parallel stripe pattern regularly in a horizontal direction and arranged in an area surrounded by the four detection pins 93 and in a surrounded area 307. The X axis line patter 96 is arranged into a parallel stripe pattern regularly in a vertical direction and arranged in an area surrounded by the four detection pins 93 and in the surrounded area 307.

The detection pins 93 and the ground line 118 formed by electrically conductive materials are connected to the reflecting plate 322. The ground line 118 is connected to the ground of the personal computer 62 main body and the detection pins 93 is equal in potential to the ground level of the personal computer 62 main body.

Referring now to FIG. 4, the strips of the X axis line pattern 96 and those of the Y axis line pattern 97 are arranged to be orthogonal to each other. In the pattern scanning direction of the X axis line pattern 96, stripe-like parallel thin lines are formed at regular intervals from a front to a direction penetrating the drawing sheet. In the pattern scanning direction of Y axis line pattern 97, stripe-like parallel thin lines are formed at regular intervals from left to right.

Also, as materials for the members constituting the pointing board 90, materials as thin as possible and as light as possible are used so that a thin, light structural body can be provided, thereby further improving the handling of the pointing board 90 and making it possible to realize a personal computer 62 of short stature.

Next, the detailed constitution of the control circuit board 109 will be described with reference to the drawings.

FIG. 5 is an enlarged perspective view showing the neighborhood of the support base 108 of the control circuit board 109 shown in FIG. 1.

Referring to FIGS. 5 and 1, the control circuit board 109 comprises a Y axis light emitting device 105 made of a near-infrared wavelength LED, a Y axis photo-detector 104 made of a photo-transistor receiving and detecting the reflected light of irradiated light from the Y axis light emitting device 105, a Y axis condenser lens 103 focusing the irradiated light from the Y axis light emitting device 105 on the Y axis line pattern 97 and optimally condensing reflected light from the Y axis line pattern 87 onto the Y axis photo-detector 104, a fixture 106 fixing the Y axis condenser lens 103, an X axis light emitting device 102 made of a near-infrared wavelength LED, an X axis photo-detector 101 made of a photo-transistor receiving and detecting the reflected light of irradiated light from the X axis light emitting device 102, an X axis condenser lens 110 focusing the irradiated light from the X axis light emitting device 102 on the X axis line pattern 96 and optimally condensing reflected light from the X line pattern 96 onto the X axis photo-detector 101, a fixture 106 fixing the X axis condenser lens 110, a shielding plate 117a shielding two portions on the both external side surfaces between the Y axis light emitting device 105 and the Y axis photo-detector 104 and one portion on the back face of the Y axis photo-detector 104 and a shielding plate 117b shielding the both side surfaces between the X axis light emitting device 102 and the X axis photo-detector 101 and two portions on the back face of the X axis photo-detector 101 both of which shielding plates 117a and 117b are intended to avoid stray light and non-uniform irradiation, a control circuit 107 including a circuit detecting the reception of light and converting an optical pulse string into a digital signal and a circuit controlling a signal from the click button 69, a support base 108 supporting the pointing board 90, a thin flexible cable connector 114 connecting a signal from the click button control circuit board 85 through the flexible cable 84, and a thin flexible cable connector 111 connected to the thin flexible cable connector 113 of the personal computer 62 main body through a flexible cable 112.

Now, description will be given to a component mounting permitted area and a component arrangement prohibited area on the control circuit board 109 so as to avoid the interference of the respective constituent components with one another and to provide the personal computer 62 of short stature, with reference to the drawings.

FIGS. 6A and 6B are a top view and a bottom view of the control circuit board 109, respectively. In FIGS. 6A and 6B, oblique lines indicate the component arrangement prohibited area.

FIG. 6A shows the upper surface of the control circuit board 109, i.e., the surface above which the pointing board 90 is assembled. An oblique line portion 151 thereon between the support base 108 and the Y axis photo-detector 104 and between the support base 108 and the X axis photo-detector 101 is defined as a component arrangement prohibited area so as to perform the good irradiation and reflection of light between the Y axis light emitting device 105 and the Y axis photo-detector 104 and between the X axis light emitting device 102 and the X axis photo-detector 101 and to avoid the interference of optical pulses with one another. Electronic and electrical components such as a control IC for constituting the control circuit 107 and the thin flexible cable connectors 114 and 111 are arranged at positions other than the oblique line portion 151.

FIG. 6B shows the lower surface of the control circuit board 1109, i.e., the surface with which the personal computer 62 is assembled. The entire surface indicated by an oblique line portion 170 is defined as a component mounting and arrangement prohibited area.

FIG. 7 is a detailed view showing positions at which detection electrodes 120 are provided on the control circuit board 109.

Referring to FIG. 7, the detection electrodes 120 are provided on a total of six portions on the side surface of the control circuit board 109, respectively. The detection electrodes 120 are conductive, connected in the control circuit board 109, and clamped to the same potential as that of a power supply by pull-up resistance.

Next, the operation of the optical pointing device 1 constituted as stated above will be described with reference to the drawings.

First, description will be given to the operations of the X axis photo-detector 101 and the Y axis photo-detector 104 which optically detect irradiated light irradiated onto the X axis line pattern 96 formed on the pointing board 90 and the Y axis line pattern 97, respectively.

Figure 8A:
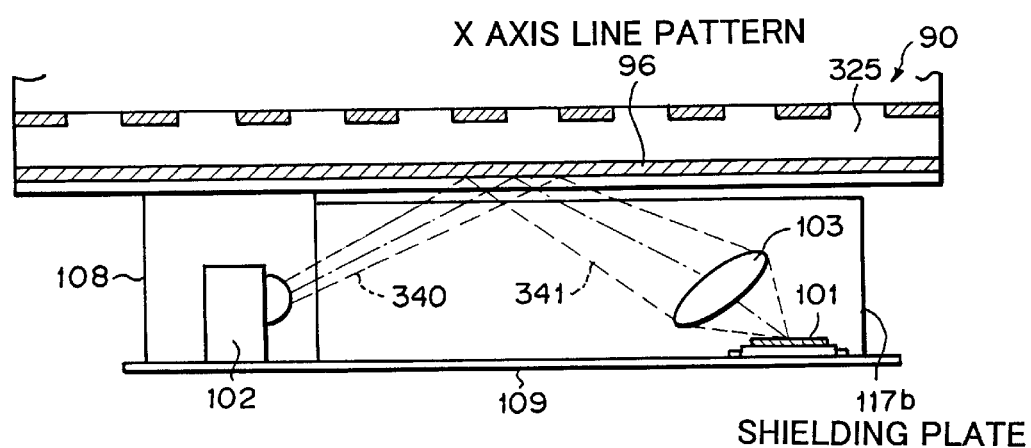
FIG. 8A is a side view showing the relationship between an X axis line pattern formed on the pointing board and irradiated light.
Figure 8B:
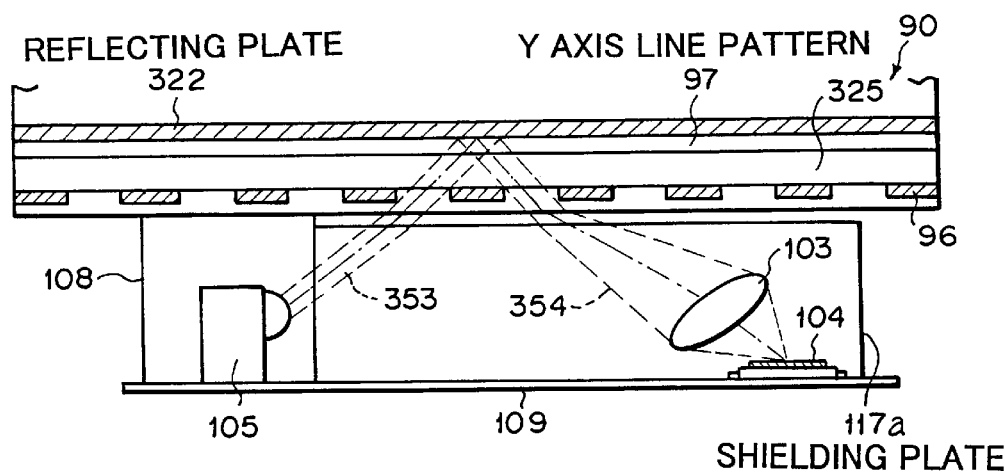
FIG. 8B is a side view showing the relationship between an Y axis line pattern formed on the pointing board and irradiated light.

FIG. 8A is a view showing the relationship between the X axis line pattern 96 and the irradiated light and FIG. 8B is a view showing the relationship between the Y axis line pattern 97 and the irradiated light.

Referring to FIG. 8A, when near-infrared irradiated light 340 irradiated from the X axis light emitting device 102 is irradiated on the pointing board 90, the irradiated light 340 is reflected on the X axis line pattern 96 formed by an aluminum thin film and is cut off between the patterns. Reflected light 341 reflected on the X axis line pattern 96 passes through the X axis condenser lens 103 to form an image by the X axis photo-detector 101.

The shielding plate 117b prevents the irradiated light 340 and the reflected light 341 from being adversely influenced by the mirroring-in of external light and greatly decreases detection errors by the X axis line pattern 96.

Referring to FIG. 8B, when near-infrared irradiated light 353 irradiated from the Y axis light emitting device 105 is irradiated on the pointing board 90, the irradiated light 353 passing through the gap between the aluminum thin patterns constituting the X axis line pattern 96 is shielded on the black printed portion constituting the Y axis line pattern 97. If the irradiated light 353 is irradiated between the black printed portions, the irradiated light 353 is reflected by the reflecting plate 322 formed above the black printed portions and the reflected light 354 passes through the Y axis condenser lens 103 to form an image by the Y axis photo-detector 104.

The shielding plate 117a prevents the irradiated light 353 and the reflected light 354 from being adversely influenced by the mirroring-in of external light or the like and greatly decreases optical pulse string detection errors by the Y axis line pattern 97.

Each of the X axis photo-detector 101 and the Y-axis photo-detector 104 consists of two photo-transistors, which are not shown. In each photo-transistor, a photocurrent is converted into an analog signal by a current-voltage conversion circuit converting a photocurrent into a voltage, the analog signal is converted into a digital signal of a rectangular wave by an A/D converter and subjected to a data processing. Since a control logical circuit is equal to that included in an optical mouse which is a well-known technique, no description will be given to this control logical circuit.

Next, description will be given to a control method when the detection pins 93 contact with the detection electrodes 120 by the movement of the pointing board 90 with reference to the drawings.

FIG. 9 is a typical view showing the connection relationship among the detection pin 93, the detection electrode 120 and a control circuit.

Referring to FIG. 9, as already stated above, the reflected plate 322, the detection pin 93 and the ground line 118 which are constituent components of the pointing board 90 and which are made of conductive materials, are mutually connected within the pointing board 90. The ground line 118 is connected to the ground of the personal computer 62 main body, whereby the detection pin 93, the reflected plate 322 and the ground line 118 are equal in potential to the ground of the personal computer 62 main body.

The detection electrode 120 provided on the control circuit board 109 carries out a pull-up 405 processing and is connected to a mask circuit 406, a photocurrent from the photo-detector 409 is converted into an analog signal by the current-voltage converter converting a photocurrent into a voltage, the analog signal is converted into a digital signal of a rectangular wave by the A/D converter, the converter 411 is connected to the mask circuit 406, the mask circuit 406 is connected to a control circuit 410, the detection pin 93 is contacted with the detection electrode 120. Considering these conditions, the control circuit 410 is controlled, thereby controlling the movement of the cursor 60.

If the detection pin 93 provided on the pointing board 90 freely moved on the support base 108 does not contact with the detection electrode 120, a high-level signal is inputted into the mask circuit 406 by the pull-up 405 processing. If the detection pin 93 contacts with the detection electrode 120, a low-level signal is inputted into the mask circuit 406. A state of contact between the detection pin 93 and the detection electrode 120 is thereby detected.

By making the mask circuit 406 possess a hysteresis function, the mask circuit 406 can avoid the influence of chattering (linking) which inevitably occurs when the detection pin 93 is contacted with or discrete from the detection electrode 120.

Next, description will be given to the control method of the optical pointing device 1 if the mask circuit 406 controls either a high-level signal or a low-level signal inputted from the detection electrode 120 to repeatedly move the cursor 60 in the same direction, with reference to the drawings.

Initially, description will be given to a process in which irradiated light from the Y axis light emitting device 105 is turned into reflected light repeating iron and off by the Y axis line pattern 97 of the pointing board 90, the reflected light is turned into an optical pulse string by the Y axis photo-detector 104 and the cursor 60 is moved, in respect of the Y axis direction, with reference to FIGS. 10A to 10I.

FIGS. 10A to 10I are schematic plan views showing a state in which the pointing board 90 is moved in the Y axis direction.

The movement of the cursor 60 in a downward direction can be executed by moving the pointing board 90 from a position shown in FIG. 10A to a downward direction 215 shown in FIG. 10B.

If the pointing board 90 is moved from an initial state shown in FIG. 10A to the downward direction 215, irradiated light 212 from the Y axis light emitting device 105 is turned into reflected light 214 by the Y axis line pattern 97 and the reflected light is turned into an optical pulse string repeating iron and off by the Y axis photo-detector 104. This optical pulse string is recognized by the Y axis detector 104.

The optical pulse string is converted into digital data by the control circuit and then subjected to a data processing by a CPU (Central Processing Unit), whereby the cursor 60 is moved according to a movement quantity. Since the processing method for converting this optical pulse string into data and the control circuit are the same as those of the control logical circuit of an optical mouse which is a well-known technique, no detailed description will be given to the processing method and the control circuit.

Referring to FIGS. 10C to 10E, if the cursor 60 is repeatedly moved in the downward direction, the pointing board 90 is moved to the downward direction 215 and any one of the four detection pins 93 is brought into contact with any one of the six detection electrodes 120 provided on the side surface of the control circuit 109.

The six detection electrodes 120 are all connected to one another within the control circuit board 109 and the four detection pins 93 are also mutually connected within the pointing board 90. It is, therefore, not necessary to contact the detection electrode 120 with the detection pin 93 in a designated combination. If any one of the six detection electrodes 120 contacts with any one of the four detection pins 93, the contact is detected.

As already described with reference to FIG. 9, the mask circuit 406 receiving a signal changing from a high level to a low level and inputted from the detection electrode 120 in response to the contact of the electrode 120 with the detection pin 93 transmits a signal for stopping the movement of the cursor 60 to the personal computer 62 main body, whereby the CPU (not shown) carries out a processing for stopping the movement of the cursor 60.

Figure 12:
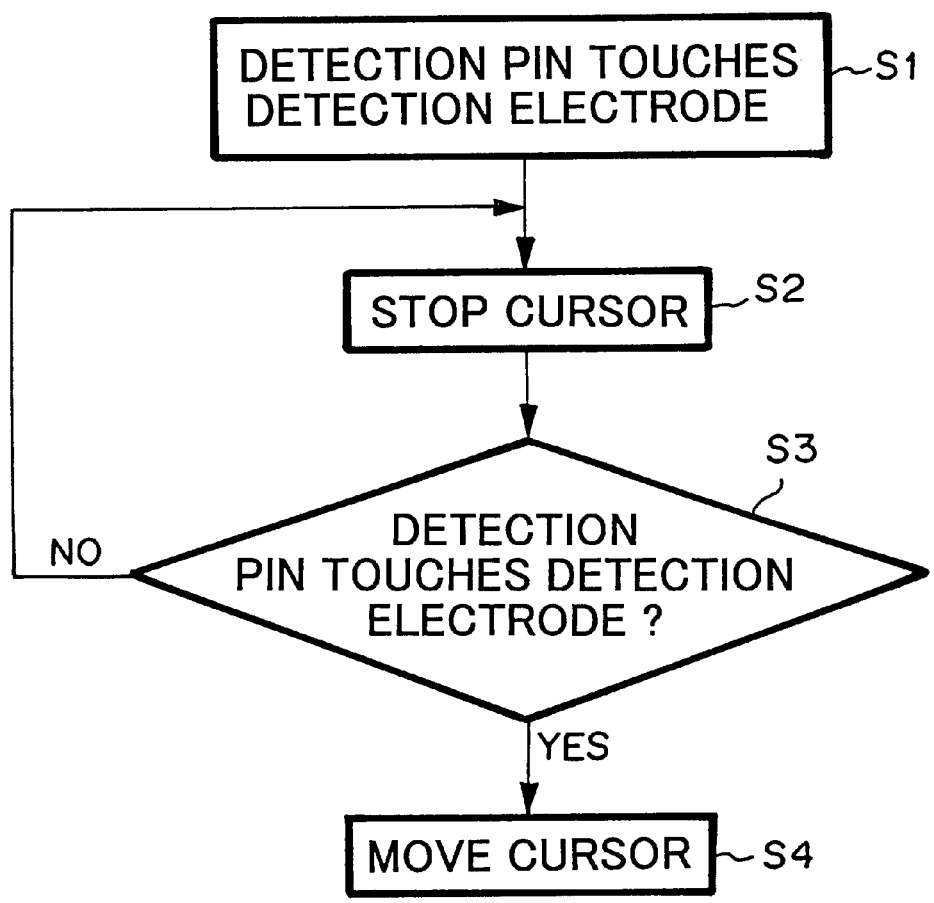
FIG. 12 is a flow chart showing a control processing method for stopping and moving a cursor.
Figure 13:
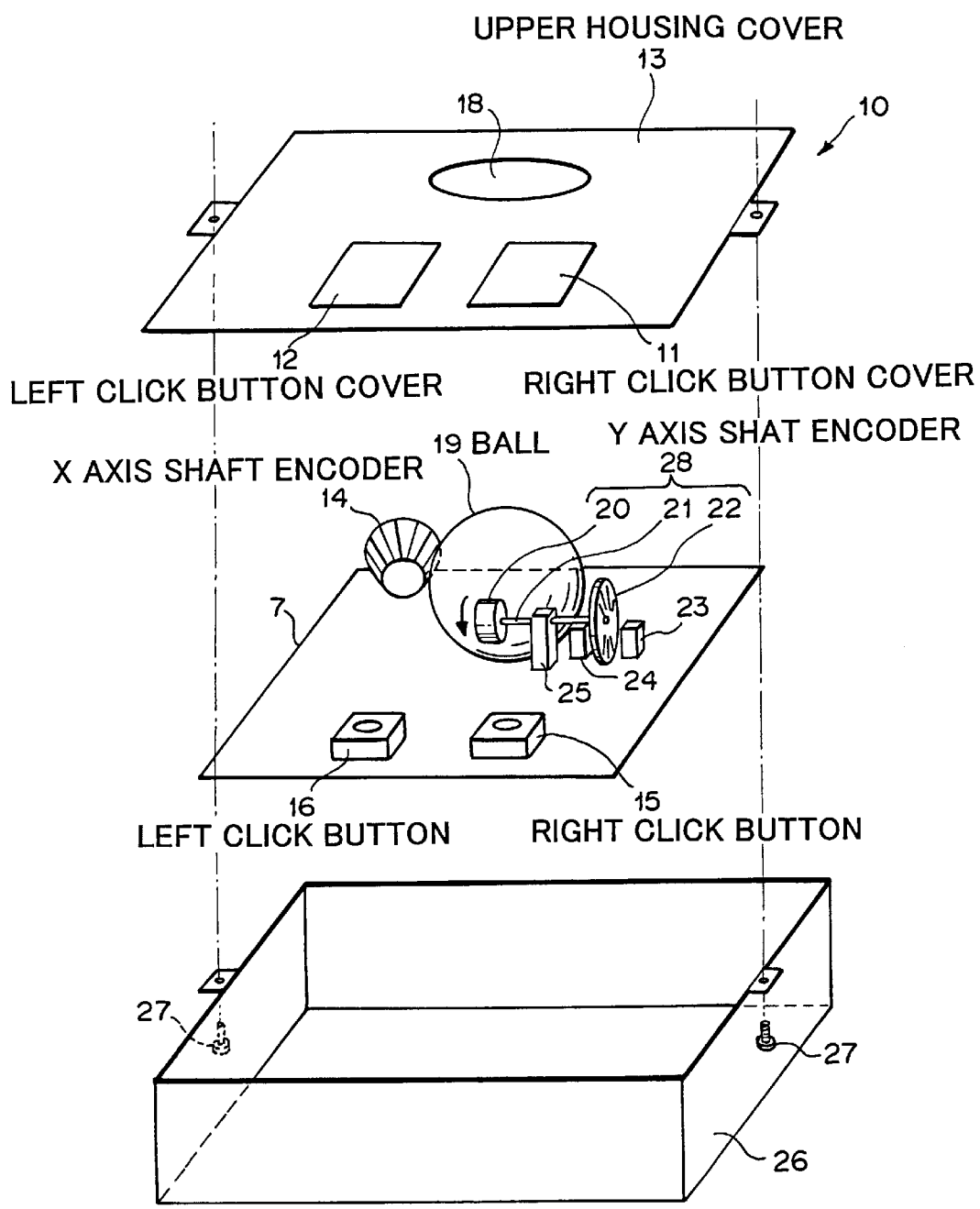
FIG. 13 is an exploded perspective view showing the schematic constitution of a conventional optical track ball.
Figure 14:
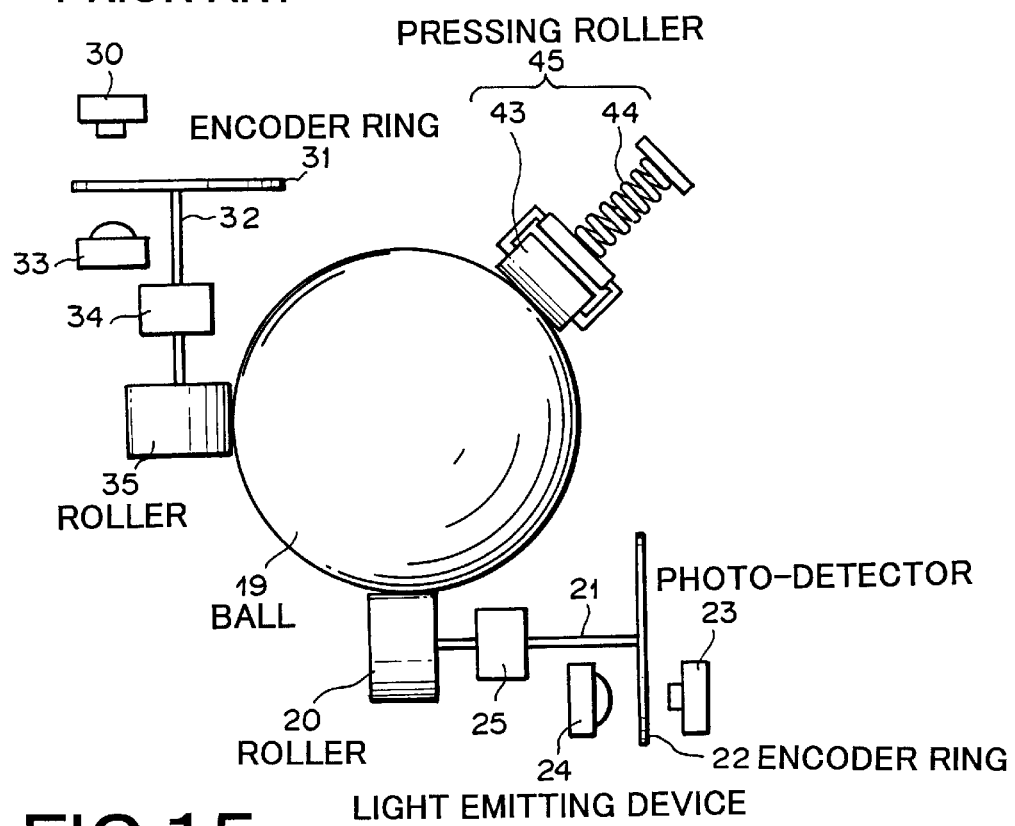
FIG. 14 is a view seen from an arrow A shown in FIG. 13.
Figure 15:
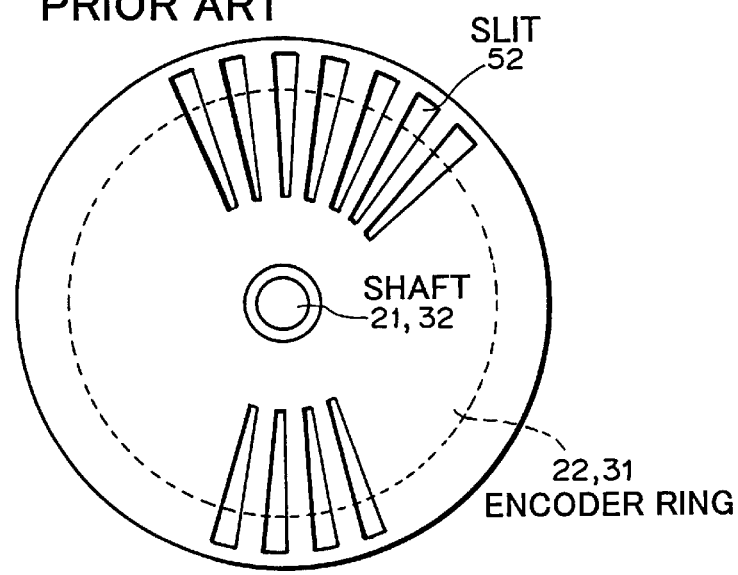
FIG. 15 is a detailed view of an encoder ring shown in FIG. 13.

Now, referring to FIG. 12 showing a control processing program for stopping and moving the cursor 60 in the form of a flow chart, a control method for stopping and moving the cursor 60 in response to the contact of the detection pin 93 with the detection electrode 120 will be described.

If the pointing board 90 is moved to a limit at which the pointing board 90 cannot be moved further, the detection pin 93 provided on the pointing board 90 contacts with the detection electrode 120 (in S1), whereby the control circuit 410 connected to the electrode 120 detects the contact and stops the movement of the cursor 60 (in S2).

It is judged whether or not the detection electrode 120 contacts again with the detection pin 93 (in S3). If they do not contact with each other again, the cursor 60 remains stopped. If they contact again, the movement of the cursor 60 is executed (in S4), thereby making it possible to move the cursor 60 again.

Next, as shown in FIG. 10D, the pointing board 90 is moved in an upward direction 216 and the detection pin 93 turns into a state in which the detection pin 93 contacts again with the detection electrode 120. Namely, the mask circuit 406 receiving a signal changing from a high level to a low level and inputted from the detection electrode 120, transmits a signal for moving the cursor 60 to the personal computer 62 main body. The CPU thereby carries out a processing for moving the cursor 60 to make the cursor 60 movable again. As shown in FIG. 10E, the pointing board 90 is moved in the downward direction 215 as in the case of an operation during ordinary movement, whereby the irradiated light 212 from the Y axis light emitting device 105 is turned into reflected light 214 by the Y axis line pattern 97 and the Y axis photo-detector 104 detects an optical pulse string repeating iron and off and becoming the reflected light 214.

If the cursor 60 is repeatedly moved in the downward direction, the operations shown in FIGS. 10C, 10D and 10E may be repeated in this order.

Further, the movement of the cursor 60 in the upward direction can be realized by moving the pointing board 90 in the upward direction 216 as shown in FIGS. 10A and 10F.

By moving the pointing board 90 from the initial state shown in FIG. 10A to the state shown in FIG. 10F in the upward direction 216, the irradiated light 212 from the Y axis light emitting device 105 is turned into reflected light 214 by the Y axis line pattern 97, the reflected light 214 is turned into an optical pulse string repeating iron and off by the Y axis photo-detector 104 and this optical pulse string is recognized by the Y axis photo-detector 104.

If the cursor 60 is repeatedly moved in the upward direction, the pointing board 90 is moved in the upward direction 216 until the detection pin 93 contacts with the detection electrode 120 provided on the side surface of the control circuit board 109 as shown in FIG. 10G and then the movement of the cursor 60 is stopped.

Thereafter, as shown in FIG. 10H, the pointing board 90 is moved in the downward direction 215 and the detection electrode 120 and the detection pin 93 contact with each other, whereby the control circuit 410 detects the contact to make the cursor 60 movable again. As shown in FIG. 10I, the pointing board 90 is moved in the upward direction 216 as in the case of an operation during ordinary movement, whereby the irradiated light 212 from the Y axis light emitting device 105 is turned into the reflected light 214 by the Y axis line pattern 97 and the Y axis photo-detector 104 detects an optical pulse string repeating iron and off and becoming the reflected light 214.

To repeatedly move the cursor 60 in the upward direction, operations shown in FIGS. 10G, 10H and 10I may be repeated in this order.

Next, description will be given to a process in which the irradiated light irradiated from the X axis light emitting device 102 is turned into reflected light repeating iron and off by the X axis line pattern 96 of the pointing board 90, and the reflected light is turned into an optical pulse string by the X axis light detector 101 and the cursor 60 is thereby moved, with reference to FIGS. 11A to 11I.

FIGS. 11A to 11I are schematic plan views showing a state in which the pointing board 90 is moved in the X axis direction.

Figure 11A:
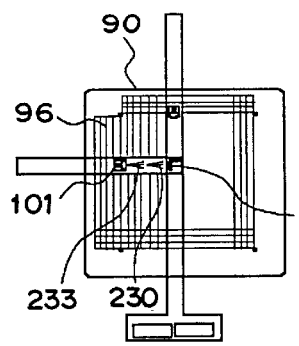
FIGS. 11A to 11I are schematic plan views showing various states when the pointing board is moved to an X axis direction.
Figure 11B:
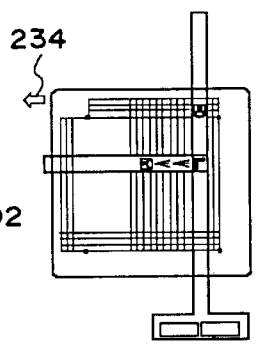

The movement of the cursor 60 in a left direction can be executed by moving the pointing board 90 from a position shown in FIG. 11A to a position shown in FIG. 11B in a left direction 234.

If the pointing board 90 is moved from an initial state shown in FIG. 11A to the left direction 234, irradiated light 230 from the X axis light emitting device 102 is turned into reflected light 223 by the X axis line pattern 96 and the reflected light 233 is turned into an optical pulse string repeating iron and off by the X axis photo-detector 101. This optical pulse string is recognized by the X axis detector 101.

Figure 11C:
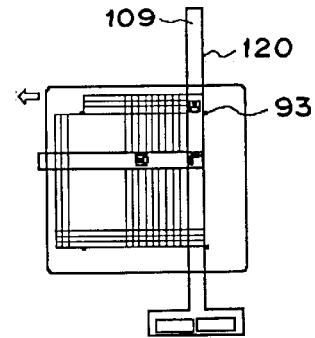
Figure 11D:
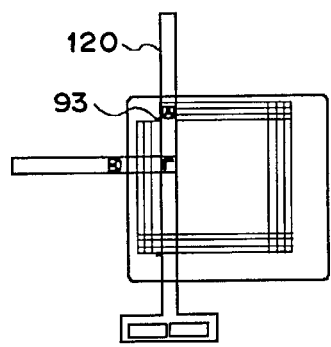
Figure 11E:
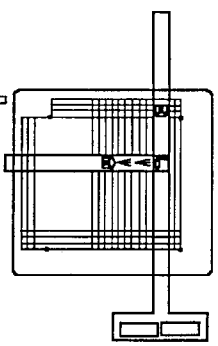

Referring to FIGS. 11C to 11E, if the cursor 60 is repeatedly moved in the left direction, the pointing board 90 is moved to the left direction 234 and any one of the four detection pins 93 is brought into contact with any one of the six detection electrodes 120 provided on the side surface of the control circuit 109.

The six detection electrodes 120 are all connected to one another within the control circuit board 109 and the four detection pins 93 are also mutually connected within the pointing board 90. It is, therefore, not necessary to contact the detection electrode 120 with the detection pin 93 in a designated combination. If any one of the six detection electrodes 120 contacts with any one of the four detection pins 93, the contact is detected.

The mask circuit 406 receiving a signal changing from a high level to a low level and inputted from the detection electrode 120 in response to the contact of the electrode 120 with the detection pin 93 transmits a signal for stopping the movement of the cursor 60 to the personal computer 62 main body, whereby the CPU carries out a processing for stopping the movement of the cursor 60.

The CPU allows the cursor 60 to be continuously moved and then to be stopped unless the following operation is carried out according to a flow chart shown in FIG. 12.

As shown in FIG. 11D, the pointing board 90 is moved to a right direction 238 and the detection pin 93 turns into a state in which the detection pin 93 contacts again with the detection electrode 120. Namely, the mask circuit 406 receiving a signal changing from a high level to a low level and inputted from the detection electrode 120, transmits a signal for moving the cursor 60 to the personal computer 62 main body. The CPU thereby carries out a processing for moving the cursor 60 to make the cursor 60 movable again. As shown in FIG. 11E, the pointing board 90 is moved in the left direction 234 as in the case of an operation during ordinary movement, whereby the irradiated light 230 from the X axis light emitting device 102 is turned into reflected light 230 by the Y axis line pattern 96 and the X axis detector 101 detects an optical pulse string repeating iron and off and becoming the reflected light 233.

If the cursor 60 is repeatedly moved in the left direction, the operations shown in FIGS. 11C, 11D and 11E may be repeated in this order.

Figure 11F:
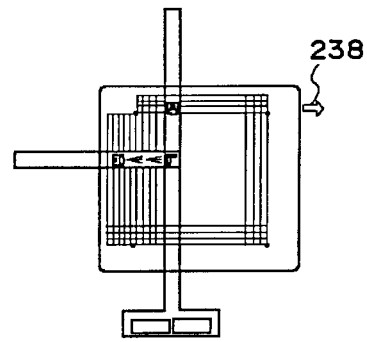

Further, the movement of the cursor 60 in the right direction can be realized by moving the pointing board 90 in the right direction 238 as shown in FIGS. 11A and 11F.

By moving the pointing board 90 from the initial state shown in FIG. 11A to the state shown in FIG. 11F, i.e., to the right direction 238, the irradiated light 230 from the X axis light emitting device 102 is turned into reflected light 233 by the X axis line pattern 96 and the reflected light 233 is turned into an optical pulse string repeating iron and off by the X axis photo-detector 101. This optical pulse string is recognized by the X axis photo-detector 101.

Figure 11G:
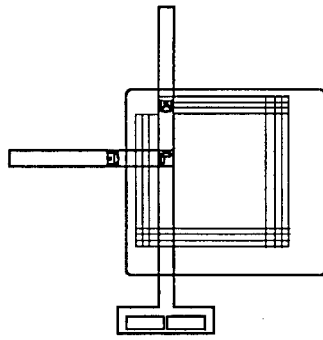

If the cursor 60 is repeatedly moved in, the right direction, the pointing board 90 is moved in the right direction 238 until the detection pin 93 contacts with the detection electrode 120 provided on the side surface of the control circuit board 109 as shown in FIG. 11G and then the movement of the cursor 60 is stopped.

Figure 11H:
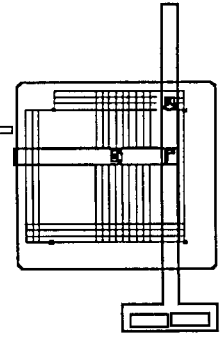
Figure 11I:
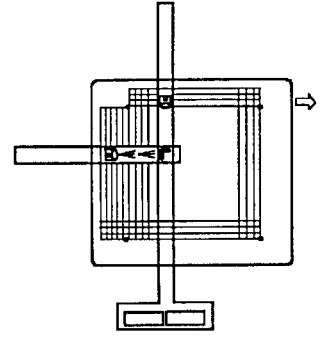

Thereafter, as shown in FIG. 11H, the pointing board 90 is moved to the left direction 234 and the detection electrode 120 and the detection pin 93 contact with each other, whereby the control circuit 410 detects the contact to make the cursor 60 movable again. As shown in FIG. 11I, the pointing board 90 is moved in the right direction 238 as in the case of an operation during ordinary movement, whereby the irradiated light 230 from the X axis light emitting device 102 is turned into the reflected light 214 by the X axis line pattern 96 and reflected light 233 is turned into an optical pulse string repeating iron and off by the X axis photo-detector 101. The optical pulse string is detected by the X axis photo-detector 101.

To repeatedly the cursor 60 in the right direction, operations shown in FIGS. 11G, 11H and 11I may be repeated in this order.

As stated above, the optical pointing device 1 of the present invention has advantages in that the pointing board 90 serving as the mechanically movable section is made movable two-dimensionally or in the plane, whereby the device of short stature can be provided and the device can be used integrally with an apparatus, typically the notebook personal computer 62, having a limited stature and a limited space.

Further, since the number of the components of the movable section can be greatly reduced, it is possible to reduce component cost, assembly cost and component and assembly management cost and it is also possible to improve the yield of a production line and reliability, thereby making it possible to deal with the realization of assembly automation.

What is claimed is:

1. An optical pointing device for moving a cursor on a display screen of a computer, which comprises:

a pointing board having stripe-like line patterns provided in an X axis direction and a Y axis direction, respectively, the patterns orthogonal to each other, and having a protruding portion;

an upper housing cover covering an upper surface of said pointing board, and having an opening portion provided around said protruding portion of said pointing board, a left click button cover, and a right click button cover;

a click button control circuit board mounting thereon a left click button and a right click button arranged right under said left click button cover and said right click button cover, respectively, and a first thin flexible cable connector, the click button control circuit board fixed to a lower surface of said upper housing;

a control circuit board having a support base supporting said pointing board, a light emitting device irradiating light to said line patterns, a photo-detector detecting said irradiated light reflected by said line patterns, and a control circuit controlling a signal from said photo-detector and signals from said left click button and said right click button;

wherein said pointing board has a transparent core, a transparent lower surface film bonded to a lower surface of said core through a transparent adhesive, and X axis line pattern formed on said lower surface film and having a regularly parallel stripe-like pattern printed thereon, a hard coat film formed on said X axis line pattern, a Y axis line pattern formed on an upper surface of said core through a transparent adhesive and printed black into a regularly parallel stripe-like pattern, a reflecting plate provided on said Y axis line pattern, and a protection sheet bonded to said reflecting plate.

2. The optical pointing device according to claim 1, wherein said pointing board is moved on said support base in an arbitrary direction by operating said protruding portion.

3. The optical pointing device according to claim 1, wherein a non-slip treatment is conducted to a surface of said protruding portion.

4. The optical pointing device according to claim 1, wherein said pointing board has an X axis marker line and a Y axis marker line serving as marks indicating a movement direction for the X axis forward direction line and the Y axis forward direction line provided around said protruding portion.

5. The optical pointing device according to claim 1, wherein said core is acrylic resin.

6. The optical pointing device according to claim 1, wherein said X axis line pattern is formed by a thin film made of an aluminum material.

7. The optical pointing device according to claim 1, wherein said hard coat film is formed by a glass hard coat subjected to a heat curing treatment or a hard coat of a photo-curing acrylic resin.

8. The optical pointing device according to claim 1, wherein said reflecting plate is formed by a conductive material.

9. The optical pointing device according to claim 1, wherein irradiated light to said X axis line pattern is reflected by said aluminum thin film, and irradiated light to said Y axis line pattern is reflected by said reflecting plate.

10. The optical pointing device according to claim 1, wherein said pointing board has a ground line and a plurality of detection pins for detecting positions becoming limits of a movement range, the detection pins and the ground line provided on a lower surface side, and a plurality of said detection pins and said ground line are connected to said reflecting plate.

11. The optical pointing device according to claim 10, wherein said ground line is connected to a ground of said computer main body, and electric potentials of plurality of said detection pins are equal to a ground level of said computer main body.

12. The optical pointing device according to claim 1, wherein said support base is formed by a material having a low friction factor with respect to said hard coat film.

13. The optical pointing device according to claim 1, wherein said control circuit board has a plurality of conductive detection electrodes provided on a side surface, and has means for electrically detecting the limits of the movement range of said pointing board when said detection electrodes contact with said detection pins.

14. The optical pointing device according to claim 1, wherein said control circuit board has shielding plates for preventing stray lights with respect to the reflected light from said X axis line pattern and the reflected light from said Y axis line pattern, respectively.

15. The optical pointing device according to claim 1, wherein said control circuit board has a second flexible cable connector connected to said first thin flexible cable connector on said click button control circuit board through a flexible cable, and a third flexible cable connector connected to said computer main body through a flexible cable.

16. The optical pointing device according to claim 1, wherein said control circuit board has a mask circuit for detecting electrically the limits of the movement range of said pointing board to stop an operation of said cursor, and then for detecting electrically that said pointing board is returned to a predetermined position where said cursor becomes movable, if said pointing board is repeatedly moved in a same direction.

17. The optical pointing device according to claim 1, wherein said light emitting device is an LED which emits near-infrared light.

18. The optical pointing device according to claim 1, wherein said photo-detector is a photo-transistor.

* * * * *